US007042899B1

(12) United States Patent
Vaida et al.

(10) Patent No.: US 7,042,899 B1
(45) Date of Patent: May 9, 2006

(54) APPLICATION SPECIFIC INTEGRATED CIRCUIT HAVING A PROGRAMMABLE LOGIC CORE AND A METHOD OF OPERATION THEREOF

(75) Inventors: Theodore F. Vaida, Lafayette, CO (US); Rajiv K. Singh, Broomfield, CO (US); Peter Gasperini, San Carlos, CA (US)

(73) Assignee: LSI Logic Corporation, Milpitas, CA (US)

( * ) Notice: Subject to any disclaimer, the term of this patent is extended or adjusted under 35 U.S.C. 154(b) by 954 days.

(21) Appl. No.: 09/851,181

(22) Filed: May 8, 2001

(51) Int. Cl.
*H04L 12/66* (2006.01)
(52) U.S. Cl. .................. 370/463; 370/429; 710/100
(58) Field of Classification Search ............ 370/419, 370/420, 463; 710/100, 104, 107, 110, 300, 710/305
See application file for complete search history.

(56) References Cited

U.S. PATENT DOCUMENTS

| | | | |
|---|---|---|---|
| 4,969,121 A * | 11/1990 | Chan et al. | 710/113 |
| 6,205,509 B1 | 3/2001 | Platko et al. | |
| 6,226,292 B1 | 5/2001 | DiPlacido | |
| 6,260,087 B1 * | 7/2001 | Chang | 710/100 |
| 6,263,388 B1 * | 7/2001 | Cromer et al. | 710/107 |
| 6,347,347 B1 | 2/2002 | Brown et al. | |
| 6,363,444 B1 * | 3/2002 | Platko et al. | 710/110 |
| 6,393,457 B1 | 5/2002 | Allison et al. | |
| 6,701,432 B1 | 3/2004 | Deng et al. | |
| 6,807,581 B1 | 10/2004 | Starr et al. | |

OTHER PUBLICATIONS

Vaidar, Theodore, PLC advanced technology demonstrator TestChipB, LSI Logic Corp, May 2001, IEEE, 0-7803-6591, pp. 67-70.*
Wilton et al., Programmable Logic IP Cores in SoC Design: Opportunties and Challenges, University of British Columbia, Canada, IEEE, 0-7803-6591, pp. 63-66.*
Hallschmid et al., Detailed Routing Architectures for Embedded Programmable Logic IP Cores, Department of Electrical and Computer Engineering, University of British Columbia, Feb. 2001, pp. 69-74.*

(Continued)

*Primary Examiner*—Brian Nguyen
*Assistant Examiner*—Tri H. Phan
(74) *Attorney, Agent, or Firm*—Hitt Gains, PC (57) ABSTRACT

The present invention provides an application specific integrated circuit and a method of operation thereof. In one advantageous embodiment, the application specific integrated circuit includes a programmable logic core having an array of dynamically configurable arithmetic logic units. This particular embodiment further includes a network interface subsystem that includes a media access controller. The network interface is configured to employ a first portion of the programmable logic core that interfaces with the media access controller and that is configurable to process control data. This embodiment further includes a data transmission subsystem associated with a memory device, and configured to employ a second portion of the programmable logic core that stores received data from the network interface subsystem to the memory device and sends transmission data from the memory device to the network interface subsystem in response to an instruction from a host system.

42 Claims, 6 Drawing Sheets

OTHER PUBLICATIONS

A C Compiler for a Processor with a Reconfigurable Functional Unit; Proceedings of the 37th ACM/IEEE Conference on Design Automation Conference, 2000—Author(s)—Ye et al.

Using General-Purpose Programming Languages for FPGA Design; DAC 2000—Author(s)—Hutchings et al.

Reconfigurable Computing: Its Concept and a Practical Embodiment Using Newly Developed Dynamically Reconfigurable Logic (DRL) LSI; ASP-DAC 2000—Author(s)—Masakazu Yamashina.

Reconfigurable Computing: What, Why and Implications for Design Automation; DAC 1999—Author(s)—DeHorn et al.

An Automated Temporal Partitioning and Loop Fission Approach for FPGA Based Reconfigurable Synthesis of DSP Applications; DAC 1999—Author(s)—Meenakshi Kaul.

Dynamically Reconfigurable Architecture for Image Processor Applications; DAC 1999—Author(s)—Alexandro Adario.

A Representation for Dynamic Graphs in Reconfigurable Hardware and its Application to Fundamental Graph Algorithms; FPGA 2000—Author(s)—Lorenz Huelsbergen.

A Reconfigurable Multi-Function Computing Cache Architecture; DCNL Conference 2000—Author(s)—Kim et al.

Communicating Logic: An Alternative Embedded Stream Processing Paradigm; ASP-DAC 2000—Author(s)—Imlig et al.

The Application of Genetic Algorithms to the design of Reconfigurable Reasoning VLSI Chips; FPGA 2000—Author(s)—Moritoshi Yasunaga.

A Benchmark Suite for Evaluating Configurable Computing Systems—Status, Reflections, and Future Directions; FPGA 2000—Author(s)—Kumar et al.

A Scheduling and Allocation Method to Reduce Data Transfer Time by Dynamic Reconfiguration; Asia and South Pacific DAC 2000—Author(s)—Kazuhito Ito.

An Architecture-Driven Metric for Simultaneous Placement and Global Routing for FPGA's; DAC 2000—Author(s)—Chang et al.

MorphoSys: Case Study of a Reconfigurable Computing System Targeting Multimedia Applications; DAC 2000—Author(s)—Singh et al.

LSI Logic ASICs To Add Programmable-Logic Cores; http://www.eetimes.com/story.OEG19990729S0001; EE Times; Jul. 29, 1999; 2 pages—Author(s)—Matsumoto.

* cited by examiner

APPLICATION SPECIFIC INTEGRATED CIRCUIT HAVING A PROGRAMMABLE LOGIC CORE AND A METHOD OF OPERATION THEREOF

TECHNICAL FIELD OF THE INVENTION

The present invention is directed, in general, to networking systems and, more specifically, to a an application specific integrated circuit having a programmable logic core, and a method of operation thereof.

BACKGROUND OF THE INVENTION

Many computer systems today are used in a network configuration where each network computer can transmit data to other computers on the same network. Various systems and related protocols have been developed over the years to implement these networks, such as Token Ring, Ethernet and ATM. Depending upon which network is being used, certain requirements must be met, such as the type of hardware used and the particular data characteristics associated with that network.

The Ethernet local area network (LAN) has become one of the most popular and widely used computer networks. Since the beginnings of the Ethernet in the early 1970's, computer networking companies and engineering professionals have continually worked to improve Ethernet product versatility, reliability, and transmission speeds. To ensure that new Ethernet products were compatible and reliable, the Institute of Electrical and Electronic Engineers (IEEE) formed a working group to define and promote industry LAN standards. Today, the IEEE has various Ethernet working groups that are responsible for standardizing the development of new Ethernet protocols and products under an internationally well known LAN standard called the "IEEE 802.3 standard."

There are a wide variety of standard compliant Ethernet products used for receiving, processing and transmitting data over Ethernet networks. By way of example, these networking products are typically integrated into network supporting devices, including network computers, network interface cards (NICs), routers, switching hubs, bridges and repeaters. One particular networking product that may be included within many of the above-mentioned network supporting devices is a network interface device.

Currently, two main interface devices are employed within these network supporting devices, namely Field Programmable Gate Array (FPGA) chips and Application-Specific Integrated Circuits (ASIC) chips, each having its own benefits and drawbacks, and fighting head-to-head for an increased portion of the market share in the lower volume production market. FPGAs provide a large amount of flexibility when included as part of the network interface device. Analogous with their name, FPGAs are field programmable devices that employ programmable gates to allow various configurations and can be reprogrammed in the field. This provides the ability to determine and correct any errors which may not have been detectable prior to use. Additionally, the FPGAs may be reprogrammed to accommodate new devices connected thereto.

One of the most noticed drawbacks of an FPGA, however, is its unfavorable performance. FPGAs, as compared to other network interface devices, have been known to experience certain undesirable performance issues. While FPGAs may be reprogrammed if a performance issue or an error is detected, this is not always the best solution to the problem. For example, depending on certain circumstances, an integrated device that may not be reprogrammed may be desired over a device that may be reprogrammed. One such circumstance may be the amount latency incurred due the FPGA having to interface with other devices not within the FPGA. FPGAs also experience certain density and speed issues, as compared to other network interface devices. The speed issue may be attributed to the re-programmability nature of the FPGA's gates.

As previously stated, ASIC chips are also commonly used and implemented as part of network interface devices. ASIC chips are regarded in the industry as being very fast network interface devices, providing a high performance guarantee, as compared to FPGAs. However, ASIC chips also experience certain drawbacks. One of the main drawbacks of ASIC chips, and probably the most notable deterrent against using them more frequently, is their inability to ne reprogrammed. Because they cannot be reprogrammed, an extremely large amount of time and money must be provided at an inception of the design and manufacture thereof.

Accordingly, what is needed in the art is a physical interface device that includes the benefits of prior art FPGAs and ASIC chips, however, a physical interface device that does not experience their drawbacks.

SUMMARY OF THE INVENTION

To address the above-discussed deficiencies of the prior art, the present invention provides an application specific integrated circuit and a method of operation thereof. In one advantageous embodiment, the present invention provides an application specific integrated circuit that includes a programmable logic core having an array of dynamically configurable arithmetic logic units. This particular embodiment further includes a network interface subsystem that includes a media access controller. The network interface subsystem is configured to employ a first portion of the programmable logic core that interfaces with the media access controller and that is configurable to process control data. This embodiment further includes a data transmission subsystem associated with a memory device configured to employ a second portion of the programmable logic core that stores received data from the network interface subsystem to the memory device and sends transmission data from the memory device to the network interface subsystem in response to an instruction from a host system.

In an another aspect, the present invention provides a method of operating an application specific integrated circuit. In one embodiment, the method includes dynamically configuring arithmetic logic units in a programmable logic core, employing a first portion of the programmable logic core to process control data and interface with a media access controller of a network interface subsystem, and employing a second portion of the programmable logic core to store received data from the network interface subsystem to the memory device and to send transmission data from the memory device to the network interface subsystem in response to an instruction from a host system.

In yet another embodiment, the present invention includes a network interface system, wherein the network interface system includes: (1) a host system, and (2) an application specific integrated circuit as described above.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
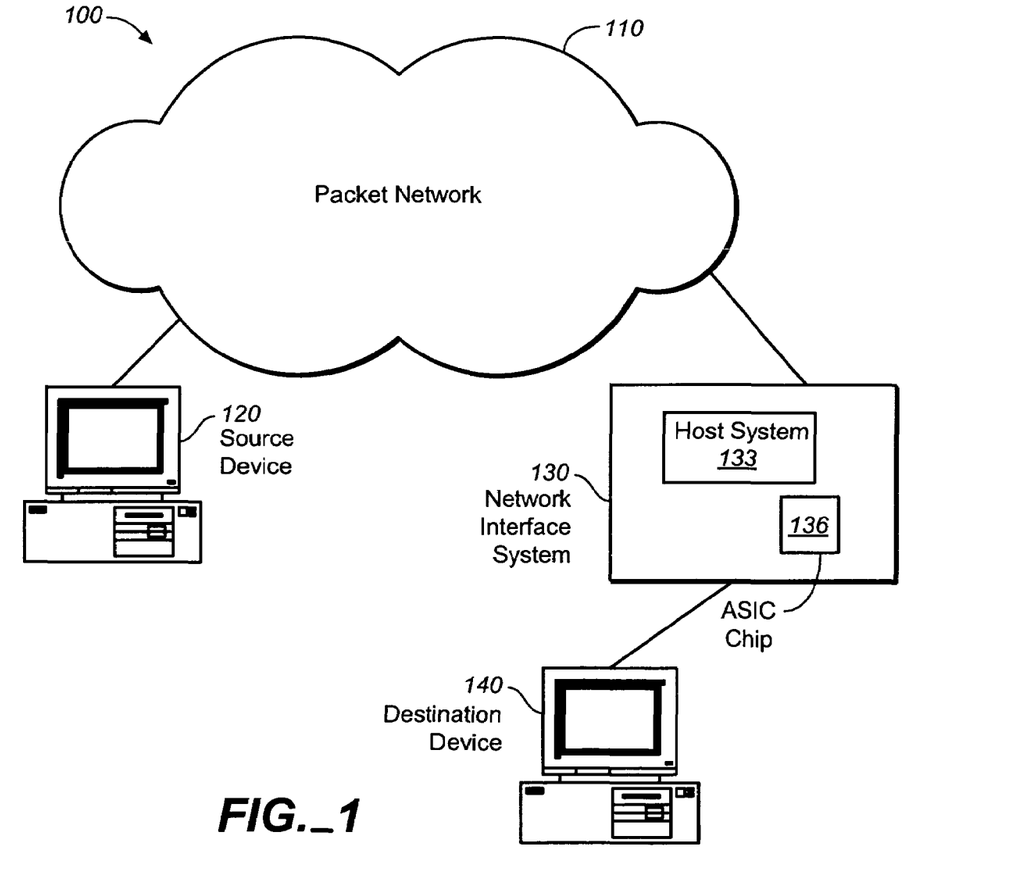
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network is designed to transmit data and other information from one point in the network to another point in the network.

As shown in the embodiment illustrated in FIG. 1, the communications network 100 may include a packet network 110, having a source device 120 coupled thereto. Also coupled to the packet network 110 is a network interface system 130. As illustrated, the network interface system 130 has a destination device 140 coupled thereto. In the illustrative embodiment shown in FIG. 1, the network interface system 130 includes a host system 133 and an application specific integrated circuit (ASIC) chip 136, both of which are in accordance with principles of the present invention. The host system 133 may be of conventional design and may comprise any type of microprocessor. Examples of such commercially available microprocessors, include: ARM944 or ARM966 microprocessors, which may be purchased from LSI Logic Inc., having a business address of 1551 McCarthy Boulevard, Milpitas, Calif. 95035.

Figure 2:
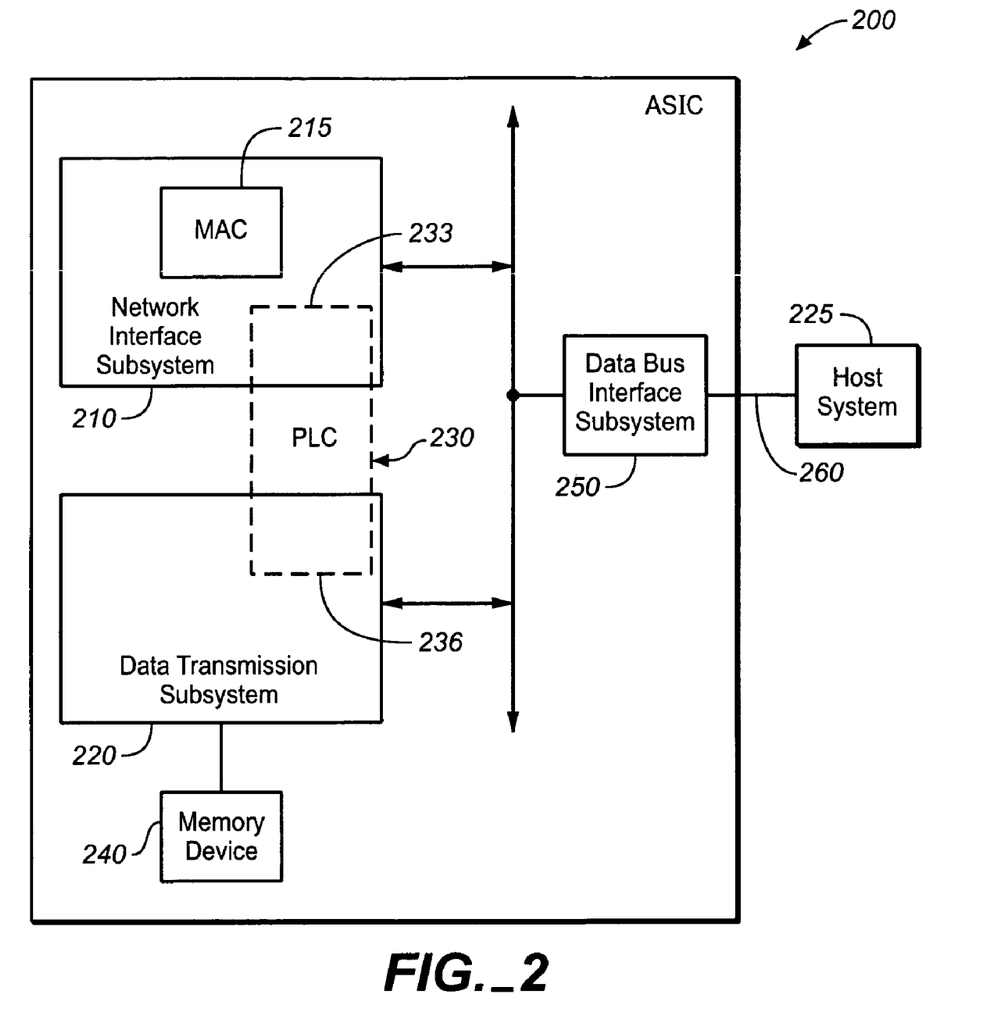
FIG. 2 illustrates a high-level block diagram of an embodiment of an application specific integrated circuit in accordance with the principles of the present invention.

Turning now to FIG. 2, illustrated is a block diagram of an embodiment of an ASIC chip, generally designated 200, constructed in accordance with the principles of the present invention. The ASIC chip 200, in one embodiment, may be employed in the network interface system 130, illustrated in FIG. 1. The ASIC chip 200 provides a new level of silicon-level flexibility that was previously unavailable on an ASIC chip. Additionally, the ASIC chip 200 provides the programmability of traditional field programmable gate array (FPGA) chips with the price and performance that, until now, only traditional ASIC chip processors could deliver. Likewise, the ASIC chip 200 experiences a reduced time to market and a reduced risk after reaching market, both of which play a vital role in today's competitive market.

In the illustrative embodiment shown in FIG. 2, the ASIC chip 200 includes a network interface subsystem 210 and a data transmission subsystem 220. As illustrated, a programmable logic core (PLC) 230 may form a portion of the network interface subsystem 210 and a portion of the data transmission subsystem 220. The PLC 230 includes an array of programmable arithmetic logic units, which may be programmed by a host system 225 through a bus or a serial interface. The PLC 230 is dynamically configurable; that is, the PLC 230 may be configured (e.g., programmed) while the PLC 230 is executing a current configuration. The dynamic configurability of the PLC 230 allows the ASIC chip 200 to execute one configuration (e.g., set of functions) for a given data and reconfigure and execute a new configuration for another data. This unique feature of the ASIC chip 200 provides a degree of programming flexibility that was not previously available in the prior art hardwired ASIC devices.

The network interface subsystem 210 includes a media access controller (MAC) 215, and is configured to employ a first portion 233 of the PLC 230, which interfaces with the MAC 215. In an advantageous embodiment, the first portion 233 is configured to process control data. The data transmission subsystem 220 is associated with a memory device 240, and is configured to employ a second portion 236 of the PLC 230. In an advantageous embodiment, the second portion 236 is configured to store received data from the network interface subsystem 210 to the memory device 240, and send transmission data from the memory device 240 to the network interface subsystem 210, all in response to an instruction from the host system 225. For the purposes of the present invention, the phrase "configured to" means that the device, the system, or the subsystem, includes the necessary software, hardware, firmware or a combination thereof to accomplish the stated task.

As illustrated, a data bus interface subsystem 250 couples the network interface subsystem 210 and the data transmission subsystem 220 to a slave bus 260. The slave bus 260 may then be coupled to the host system 225. While the block diagram illustrated in FIG. 2 shows some of the devices that may be included within the ASIC chip 200, it should be noted that other components not shown may be included therein without departing from the scope of the present invention.

Figure 3:
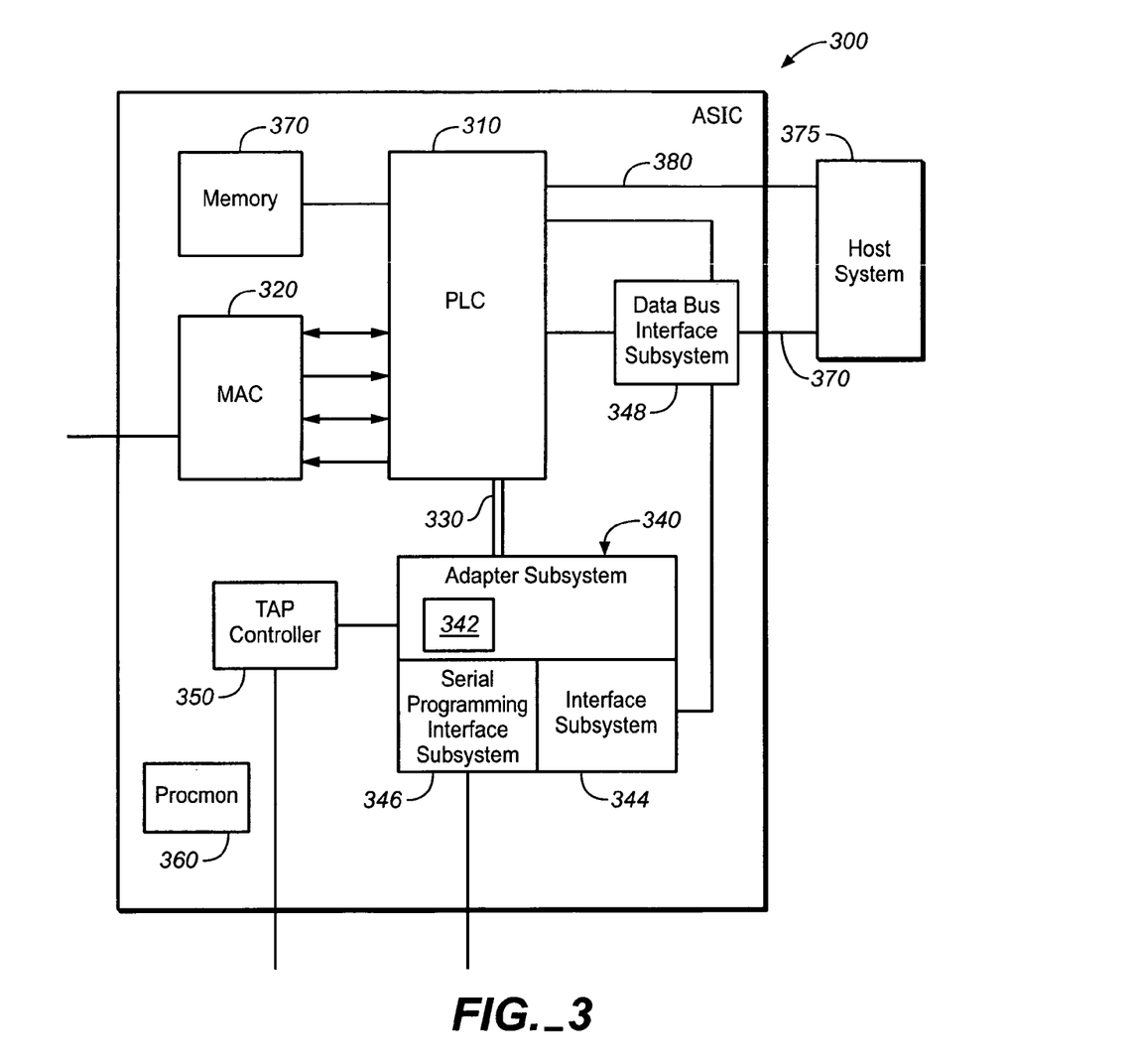
FIG. 3 illustrates a block diagram of another embodiment of an application specific integrated circuit constructed in accordance with the principles of the present invention.

Turning now to FIG. 3, illustrated is an alternative embodiment of an ASIC chip, generally designated 300. The ASIC chip 300 illustrated in FIG. 3 includes a PLC 310 coupled to a MAC 320. The PLC 310, as previously recited, comprises an array of dynamically configurable arithmetic logic units. In one advantageous embodiment, the PLC comprises an array of 16 (4×4) Hex blocks. A Hex block is generally understood as the smallest geometric region used to build larger arrays. As such, arrays are commonly quoted in terms of Hex blocks, wherein each Hex block contains 16 quad blocks, and each quad block contains 4 register transfer level (RTL) configurable arithmetic logic units.

Also included within the ASIC chip 300 illustrated in FIG. 3, and coupled to the PLC 310, is an adapter subsystem 340. The adapter subsystem 340 is coupled to the PLC 310 by a control/test interface bus 330 and is configured to provide the necessary operational circuitry for the ASIC chip 300. In the illustrative embodiment shown in FIG. 3, the adapter subsystem 340 includes a programmable logic core test circuit 342, a parallel interface subsystem 344 and a serial programming interface subsystem 346, which may be an electrically erasable programmable read-only memory (EEPROM) device.

In the embodiment illustrated in FIG. 3, the parallel interface subsystem 344 is coupled a data bus interface subsystem 348 via a high speed/high performance bus. The PLC 310 is also coupled to the data bus interface subsystem 348. Additionally, the data bus interface subsystem 348 is coupled to a slave bus 370 to allow communication with a host system 375. In another embodiment, the PLC 310 may also be coupled to a master bus 380 that allows the ASIC chip 300 to function as a master device. The adapter subsystem 340 may also include a conventional JTAG TAP controller 350.

The ASIC chip 300 may further include a conventional process monitor (procmon) 360 and a memory device 370. The procmon 360 is used to monitor the process of the ASIC chip 300 during manufacturing. The memory device 370 is designed to provide memory for the ASIC chip 300.

Figure 4:
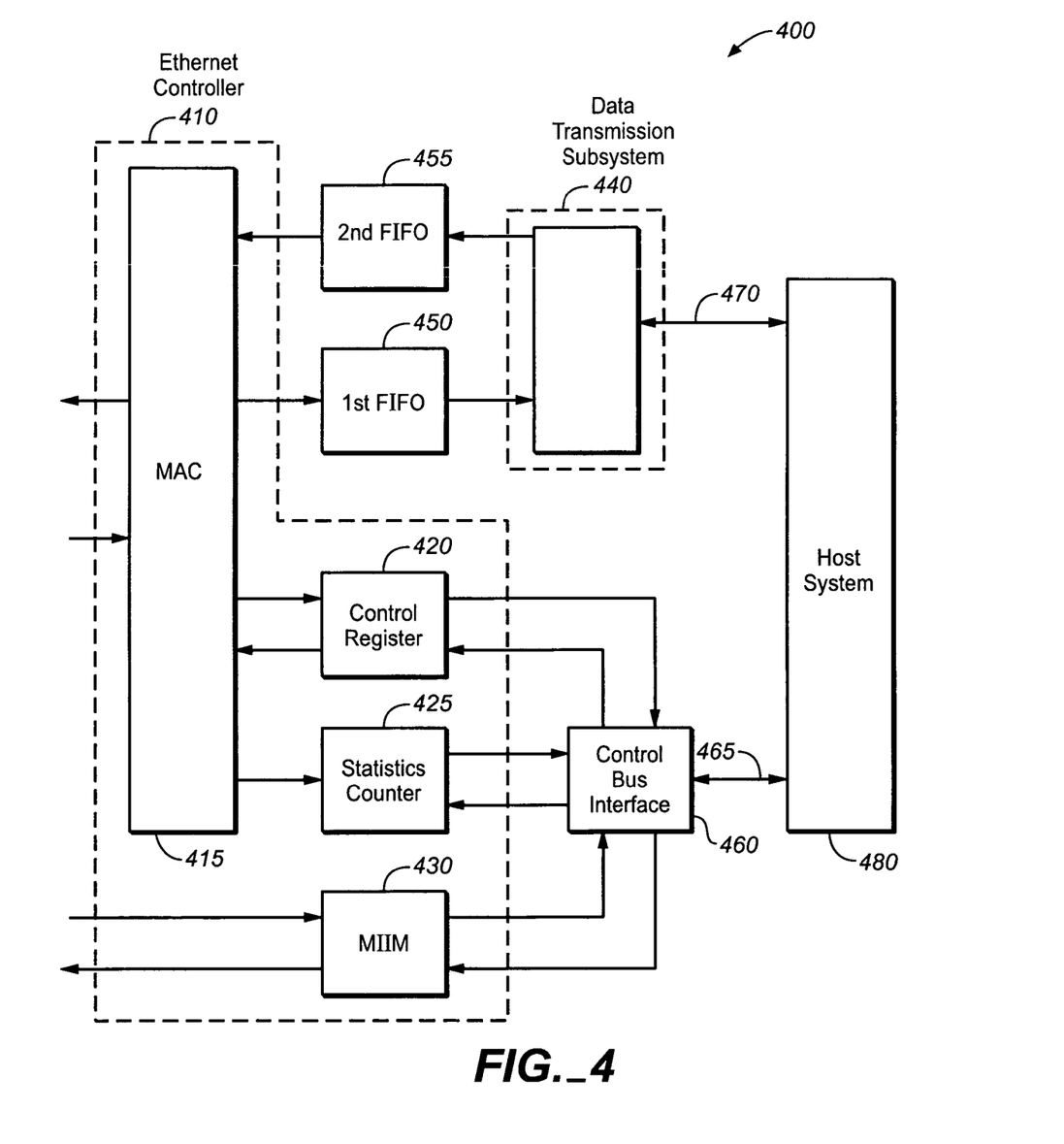
FIG. 4 illustrates a block diagram of an alternative embodiment of an ASIC chip wherein a network interface subsystem is configured as an ethernet controller.

Turning now to FIG. 4, illustrated is an alternative embodiment of an ASIC chip 400 that includes a network interface subsystem that is configured as an ethernet controller 410 and also includes a data transmission subsystem 440, which is one embodiment may be a direct memory access controller. The ethernet controller 410 and the data transmission subsystem 440 may be contained within a PLC. For example, a first portion of the PLC may be configured as a portion of the ethernet controller 410, and a second portion of the PLC may be configured as the data transmission subsystem 440. Alternatively, the ethernet controller 410 and the data transmission subsystem 440 may be contained in multiple PLCs.

As illustrated, the ethernet controller 410 may include a MAC 415, a control register 420, a statistics counter 425 and a media independent interface manager (MIIM) 430. In one particularly advantageous embodiment, a portion of a PLC may be configured to include the control register 420, the statistics counter 425 and the MIIM 430. The control register 420 performs conventional control functions to facilitate data flow through the MAC 415. The statistics counter 425 determines statistics and detects data collisions during transmission. The MIIM 430 is preferably a 16-bit parallel interface coupled to the MAC's 415 host side and a four-bit serial interface coupled to the MAC's 415 MIIM 430 side. The MIIM 430 may be configured to control and gather status from a physical (PHY)(not shown). The MIIM allows control of the MAC 415 and obtains statistical information from the statistics counter 425.

In an advantageous embodiment, the data transmission subsystem 440 provides a full-duplex channel interface between a first-in-first-out (FIFO) interface and memory accessed via a bus. In a preferred embodiment, the data transmission subsystem 440 may further operate as a high speed/high performance master device associated with direct memory access operations or as a low speed/low priority slave device for control processing functions of the ethernet controller 410.

Also included within the ASIC chip 400 illustrated in FIG. 4 are two conventional first-in-first-out (FIFO) buffers 450, 455. The first FIFO 450 is configured to buffer data received by the data transmission subsystem 440 from the ethernet controller 410. The second FIFO 455 is configured to buffer data transmitted from data transmission subsystem 440 to the ethernet controller 410.

In the particular embodiment illustrated in FIG. 4, a control bus interface 460 couples the ethernet controller 410 to a host system 480 through a control bus 465. The data transmission subsystem 440 is coupled to the host system 480 by a data bus 470. While many devices have been shown as included within the ASIC chip 400, it should be noted that many other devices not described nor shown, are within the scope of the present invention.

Figure 5:
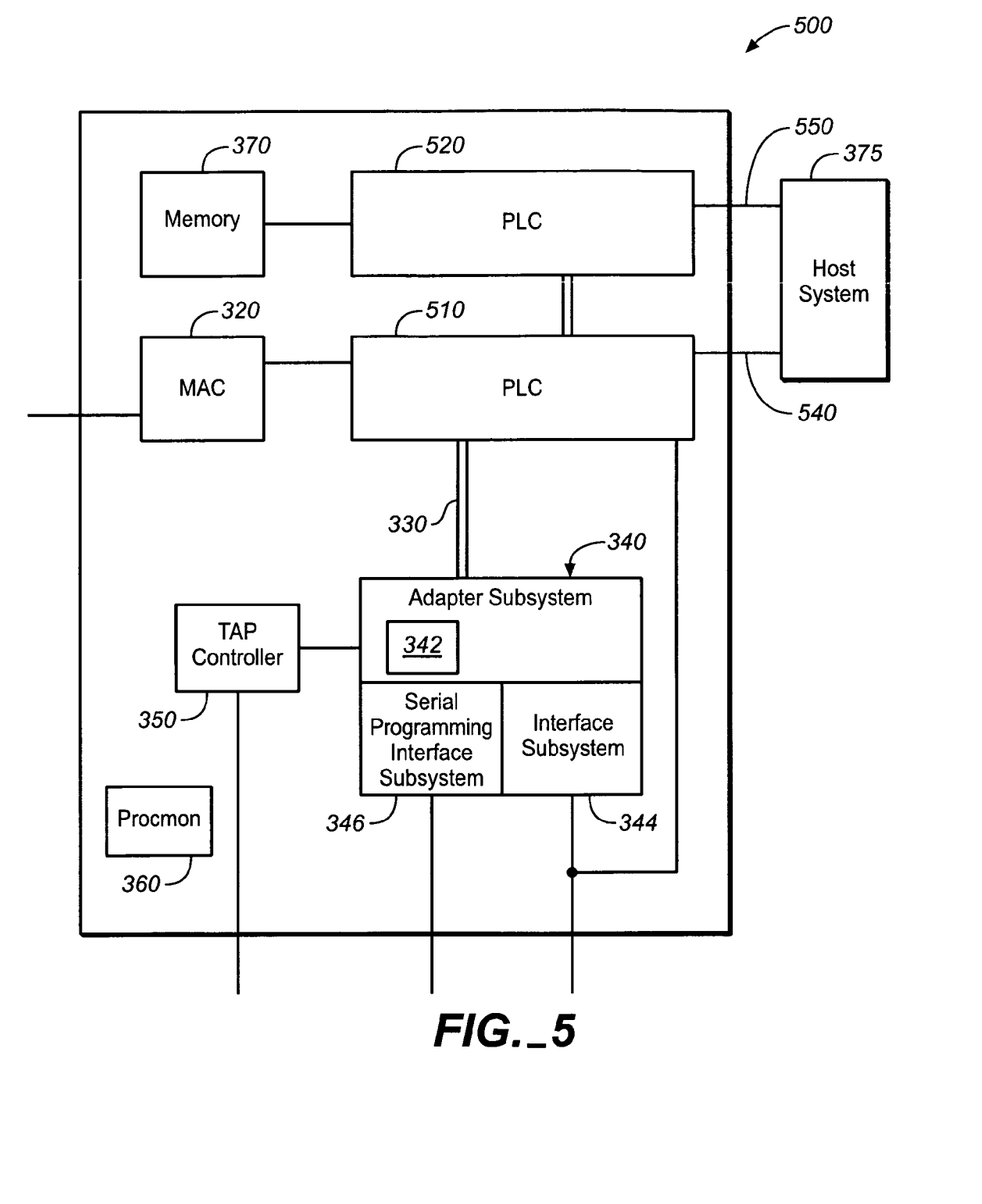
FIG. 5 illustrates a block diagram of an embodiment of an application specific integrated circuit, including two programmable logic cores, constructed in accordance with the principles of the present invention.

Turning now to FIG. 5, with continued reference to FIG. 3, illustrated is an alternative embodiment of an ASIC chip 500, including a first PLC 510 and a second PLC 520. While only a first PLC 510 and a second PLC 520 have been illustrated, one skilled in the art understands that more than two PLC's are within the scope of the present invention. In the illustrative embodiment, the first PLC 510 is dynamically configurable to process control data. Likewise, the second PLC 510 is dynamically configurable as a DMAC to store received data from the MAC 320 to a memory device, and send transmission data from the memory device to the MAC 320, in response to an instruction from the host system 375. In this particular embodiment, the first PLC 510 is couplable to the host system 375 by a control bus 540 and the second PLC 520 is couplable to the host system 375 by a data bus 550.

Figure 6:
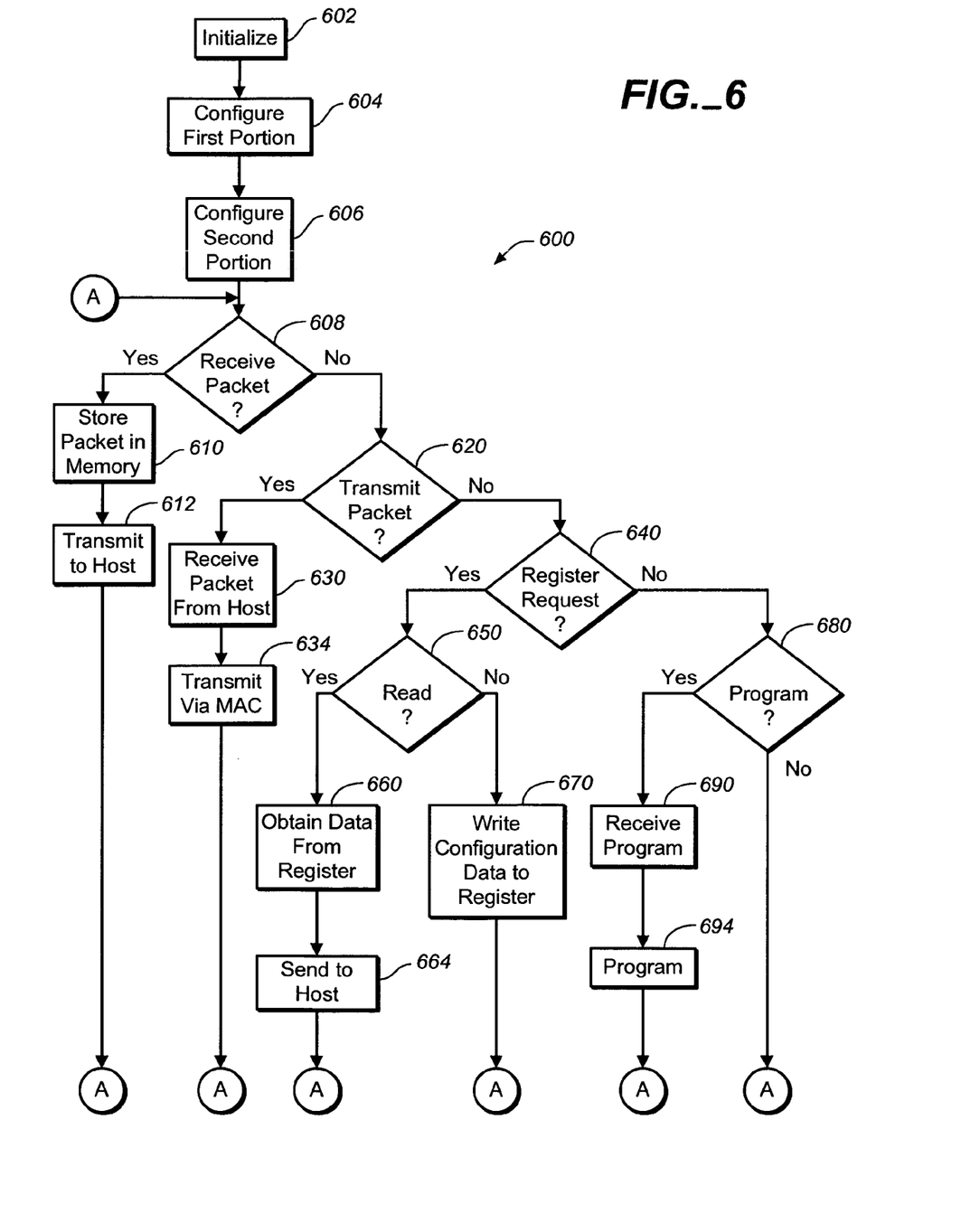
FIG. 6 illustrates a flow diagram of an embodiment of a method of operating an application specific integrated circuit constructed in accordance with the principles of the present invention.

Turning now to FIG. 6, with continued reference to FIGS. 2–5, illustrated is a flow diagram of an embodiment of a method, generally designated 600, of operating an ASIC chip in accordance with the principles of the present invention. In FIG. 6, the ASIC chip first performs initialization in a step 602.

After initialization, a first portion of the PLC is configured in a step 604 to process control data employed in a network interface subsystem, and a second portion of the PLC is configured in a step 606 as a data transmission subsystem. It should be noted, however, that when the ASIC chip includes more than one PLC rather than one PLC divided into a first portion and a second portion, the first PLC would be configured in a step 604 and the second PLC would be configured in a step 606.

After steps 604 and 606, the ASIC chip determines whether a packet has been received from a physical device, in a decisional step 608. In one particularly advantageous embodiment, it is the network interface subsystem that determines whether a packet has been received. If a packet has been received, the packet is stored in memory, in a step 610. Next, the packet may be transmitted to a host system in a step 612. In one embodiment, the data transmission subsystem may transmit the packet to the host system. Then, the ASIC chip returns to receive another packet in the decisional step 608.

If a packet has not been received in the decisional step 608, the ASIC chip determines whether a packet should be transmitted, in a decisional step 620. If the ASIC chip determines that the packet should be transmitted, the packet is received from the host system in a step 630. In one embodiment, the data transmission subsystem may receive the packet. Next, the ASIC chip transmits the packet to the physical device via the MAC, in a step 634. Then, the ASIC chip returns to receive another packet in the decisional step 608.

If the ASIC chip determines that the packet should not be transmitted in the decisional step 620, the ASIC chip determines if a register request has been received, in a decisional step 640. If the ASIC chip determines that a register request has been received, the ASIC chip determines whether it is a read request, in a decisional step 650. If it is a read request, data is obtained from a register associated with the MAC, in a step 660, and the data is sent to the host system in a step 664. Next, the ASIC chip returns to receive another packet in the decisional step 608. However, if the ASIC chip determines that it is not a read request and that it is a write request, the write configuration data is written to the register, in a step 670. Next, the ASIC chip returns to receive another packet in the decisional step 608.

If the ASIC chip determined that no register request was received, the ASIC chip determines whether a program request is available, in a decisional step 680. If a program request is available, the program is received in a step 690, and the PLC is programmed in a step 694. Then, the ASIC chip returns to receive another packet in the decisional step 608. However, if the ASIC chip determines that no program request is available, the ASIC chip returns to receive another packet in the decisional step 608.

While it has been described that the ASIC chip is making all decisions, one skilled in the art understands that other devices within the ASIC chip, may actually be making the decisions. One skilled in the art further understands that the flow diagram 600 only illustrates one embodiment, and that other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. An application specific integrated circuit, comprising:
   a programmable logic core having an array of dynamically configurable arithmetic logic units;
   a network interface subsystem, including a media access controller, configured to employ a first portion of the programmable logic core that interfaces with the media access controller and that is configurable to process control data; and
   a data transmission subsystem associated with a memory device and configured to employ a second portion of the programmable logic core that stores received data from the network interface subsystem to the memory device and sends transmission data from the memory device to the network interface subsystem in response to an instruction from a host system.

2. The application specific integrated circuit as recited in claim 1 wherein the first portion and the second portion are embodied within a plurality of programmable logic cores.

3. The application specific integrated circuit as recited in claim 1 wherein the programmable logic core is configurable to dynamically implement functions based on information received from the host system.

4. The application specific integrated circuit as recited in claim 3 wherein the programmable logic core is configurable to program new functions while executing previously implemented functions.

5. The application specific integrated circuit as recited in claim 1 wherein the programmable logic core is coupled to the host system by a slave bus, the programmable logic core further configured to be a slave device.

6. The application specific integrated circuit as recited in claim 5 further including an adapter subsystem, and a data bus interface subsystem that couples the adapter subsystem and the programmable logic core to the slave bus.

7. The application specific integrated circuit as recited in claim 6 wherein the adapter subsystem includes a programmable logic core test circuit, a parallel interface subsystem that couples the adapter subsystem to the data bus interface subsystem, and a serial programming interface subsystem.

8. The application specific integrated circuit as recited in claim 6 further including a control/test interface bus that couples the adapter subsystem to the programmable logic core.

9. The application specific integrated circuit as recited in claim 1 wherein the programmable logic core is further coupled to the host system by a master bus, the programmable logic core further configured to be a master device to independently control the master bus.

10. The application specific integrated circuit as recited in claim 1 wherein the first portion is configured to process control data and the second portion is configured as a direct memory access controller.

11. The application specific integrated circuit as recited in claim 1 wherein the first portion is couplable to the host system by a control bus and the second portion is couplable to the host system by a data bus.

12. The application specific integrated circuit as recited in claim 1 wherein the first portion is configured to include a control register, a statistics counter and a media independent interface manager.

13. The application specific integrated circuit as recited in claim 1 further including first-in-first-out buffers coupled to the network interface subsystem and the data transmission subsystem, one of the first-in-first-out buffers configured to buffer data received from the network interface subsystem and another of the first-in-first-out buffers configured to buffer data received from the data transmission subsystem.

14. The application specific integrated circuit as recited in claim 1 wherein the network interface subsystem is configured as an ethernet controller.

15. A method of operating an application specific integrated circuit, comprising:
    dynamically configuring arithmetic logic units in a programmable logic core;
    employing a first portion of the programmable logic core to process control data and interface with a media access controller of a network interface subsystem; and
    employing a second portion of the programmable logic core to store received data from the network interface subsystem to a memory device and to send transmission data from the memory device to the network interface subsystem in response to an instruction from a host system.

16. The method as recited in claim 15 wherein employing the first portion and the second portion includes employing first and second portions embodied within a plurality of programmable logic cores.

17. The method as recited in claim 15 wherein dynamically configuring the programmable logic core includes dynamically configuring the programmable logic core to dynamically implement functions based on information received from the host system.

18. The method as recited in claim 17 wherein dynamically configuring includes programing the programmable logic core with new functions while the programmable logic core executes previously implemented functions.

19. The method as recited in claim 15 further including providing a connection between the programmable logic core and the host system by a slave bus and configuring the programmable logic core to be a slave device.

20. The method as recited in claim 19 further including an adapter subsystem, and a data bus interface subsystem that couples the adapter subsystem and the programmable logic core to the slave bus.

21. The method as recited in claim 20 wherein the adapter subsystem includes a programmable logic core test circuit, a parallel interface subsystem that couples a support logic core to the data bus interface subsystem, and a serial programming interface subsystem.

22. The method as recited in claim 20 further including a control/test interface bus that couples the adapter subsystem to the programmable logic core.

23. The method as recited in claim 15 further including providing a connection between the programmable logic core and the host system by a master bus, and configuring the programmable logic core to be a master device to independently control the master bus.

24. The method as recited in claim 15 wherein dynamically configuring includes configuring the first portion to process control data and configuring the second portion as a direct memory access controller.

25. The method as recited in claim 15 further including providing a connection between the first portion and the host system by a control bus and providing a connection between the second portion and the host system by a data bus.

26. The method as recited in claim 15 wherein dynamically configuring includes configuring the first portion to include a control register, a statistics counter and a media independent interface manager.

27. The method as recited in claim 15 further includes buffering data received from the network interface subsystem in a first-in-first-out buffer and buffering data received from the data transmission subsystem in a second first-in-first-out buffer.

28. The method as recited in claim 15 wherein dynamically configuring includes configuring the first portion as an ethernet controller.

29. A network interface system, comprising:
a host system; and
an application specific integrated circuit, including:
a programmable logic core having an array of dynamically configurable arithmetic logic units;
a network interface subsystem, including a media access controller, configured to employ a first portion of the programmable logic core that interfaces with the media access controller and that is configurable to process control data; and
a data transmission subsystem associated with a memory device and configured to employ a second portion of the programmable logic core that stores received data from the network interface subsystem to the memory device and sends transmission data from the memory device to the network interface subsystem in response to an instruction from the host system.

30. The network interface system as recited in claim 29 wherein the first portion and the second portion are embodied within a plurality of programmable logic cores.

31. The network interface system as recited in claim 29 wherein the programmable logic core is configurable to dynamically implement functions based on information received from the host system.

32. The network interface system as recited in claim 31 wherein the programmable logic core is configurable to program new functions while executing previously implemented functions.

33. The network interface system as recited in claim 29 wherein the programmable logic core is coupled to the host system by a slave bus, the programmable logic core further configured to be a slave device.

34. The network interface system as recited in claim 33 further including an adapter subsystem, and a data bus interface subsystem that couples the adapter subsystem and the programmable logic core to the slave bus.

35. The network interface system as recited in claim 34 wherein the adapter subsystem includes a programmable logic core test circuit, a parallel interface subsystem that couples a support logic core to the data bus interface subsystem, and a serial programming interface subsystem.

36. The network interface system as recited in claim 34 further including a control/test interface bus that couples the adapter subsystem to the programmable logic core.

37. The network interface system as recited in claim 29 wherein the programmable logic core is further coupled to the host system by a master bus, the programmable logic core further configured to be a master device to independently control the master bus.

38. The network interface system as recited in claim 29 wherein the first portion is configured to process control data and the second portion is as a direct memory access controller.

39. The network interface system as recited in claim 29 wherein the first portion is couplable to the host system by a control bus and the second portion is couplable to the host system by a data bus.

40. The network interface system as recited in claim 29 wherein the first portion is configured to include a control register, a statistics counter and a media independent interface manager.

41. The network interface system as recited in claim 29 further including first-in-first-out buffers coupled to the network interface subsystem and the data transmission subsystem, one of the first-in-first-out buffers configured to buffer data received from the network interface subsystem and another of the first-in-first-out buffers configured to buffer data received from the data transmission subsystem.

42. The network interface system as recited in claim 29 wherein the network interface subsystem is configured as an ethernet controller.

* * * * *